(12) United States Patent
Newman et al.

(10) Patent No.: US 9,946,583 B2
(45) Date of Patent: Apr. 17, 2018

(54) MEDIA PLAYER FRAMEWORK

(75) Inventors: Lucas Christopher Newman, San Francisco, CA (US); Charles John Pisula, San Jose, CA (US)

(73) Assignee: Apple Inc., Cupertino, CA (US)

( * ) Notice: Subject to any disclaimer, the term of this patent is extended or adjusted under 35 U.S.C. 154(b) by 766 days.

(21) Appl. No.: 12/603,457

(22) Filed: Oct. 21, 2009

(65) Prior Publication Data

US 2010/0235741 A1  Sep. 16, 2010

Related U.S. Application Data

(60) Provisional application No. 61/160,688, filed on Mar. 16, 2009.

(51) Int. Cl.
| | | |
|---|---|---|
| G06F 21/31 | (2013.01) | |
| G06F 3/0484 | (2013.01) | |
| G06F 9/54 | (2006.01) | |
| G06F 21/30 | (2013.01) | |
| G06F 17/30 | (2006.01) | |
| G06F 3/01 | (2006.01) | |

(52) U.S. Cl.
CPC ........ G06F 9/542 (2013.01); *A63F 2300/204* (2013.01); *A63F 2300/6081* (2013.01); *G06F 3/01* (2013.01); *G06F 17/30* (2013.01); *G06F 21/30* (2013.01)

(58) Field of Classification Search
CPC ... G06F 21/31; G06F 17/30873; G06F 3/0484
USPC ........................................ 715/727, 741–743
See application file for complete search history.

(56) References Cited

U.S. PATENT DOCUMENTS

| | | | |
|---|---|---|---|
| 7,544,880 B2* | 6/2009 | Takai et al. ................... 84/612 |
| 7,694,115 B1* | 4/2010 | Porras et al. ..................... 713/1 |
| 8,042,121 B2* | 10/2011 | Harris et al. .................. 719/328 |
| 8,209,396 B1* | 6/2012 | Raman ................ H04N 21/235 |
| | | | 709/217 |
| 2002/0152210 A1* | 10/2002 | Johnson et al. ................... 707/9 |
| 2004/0158813 A1* | 8/2004 | Xia ............................ G06F 8/60 |
| | | | 717/116 |
| 2005/0060568 A1* | 3/2005 | Beresnevichiene et al. . 713/200 |
| 2005/0076237 A1* | 4/2005 | Cohen et al. .................. 713/201 |
| 2005/0240999 A1* | 10/2005 | Rubin et al. ..................... 726/22 |
| 2005/0262568 A1 | 11/2005 | Hansen et al. |
| 2006/0026677 A1* | 2/2006 | Edery et al. ..................... 726/22 |
| 2006/0205517 A1* | 9/2006 | Malabuyo et al. ............. 463/43 |
| 2006/0224943 A1* | 10/2006 | Snyder et al. ............. 715/501.1 |
| 2006/0251047 A1* | 11/2006 | Shenfield ................... G06F 8/20 |
| | | | 370/351 |
| 2006/0254409 A1* | 11/2006 | Withop .......................... 84/601 |

(Continued)

*Primary Examiner* — Doon Chow
*Assistant Examiner* — Le Nguyen
(74) *Attorney, Agent, or Firm* — Womble Bond Dickinson (US) LLP

(57) ABSTRACT

Systems and methods for managing media playback are described. In one embodiment, a third party media request is received from a third party application. A native media request is sent to a native media player in response to the third party media request. The native media request causes the native media player to access content or metadata. Metadata is returned to the third party application if the third party media request requested data. The native media player performs a content operation on the content if the third party media request requested a content operation.

36 Claims, 8 Drawing Sheets

(56) References Cited

U.S. PATENT DOCUMENTS

| | | | |
|---|---|---|---|
| 2007/0039048 A1* | 2/2007 | Shelest et al. | 726/22 |
| 2007/0079691 A1* | 4/2007 | Turner | 84/612 |
| 2007/0239456 A1* | 10/2007 | Goodman | G10L 21/06 704/270 |
| 2007/0239999 A1* | 10/2007 | Honig et al. | 713/194 |
| 2007/0260697 A1* | 11/2007 | Shapiro | 709/212 |
| 2007/0288717 A1* | 12/2007 | Camiel | G06F 3/0608 711/170 |
| 2008/0005349 A1* | 1/2008 | Li et al. | 709/231 |
| 2008/0016176 A1* | 1/2008 | Leitner | A63F 13/10 709/217 |
| 2008/0077626 A1* | 3/2008 | Williams et al. | 707/200 |
| 2008/0162358 A1* | 7/2008 | Patsiokas et al. | 705/57 |
| 2008/0167741 A1* | 7/2008 | Lay et al. | 700/94 |
| 2008/0172138 A1* | 7/2008 | Pickford et al. | 700/94 |
| 2008/0195664 A1* | 8/2008 | Maharajh et al. | 707/104.1 |
| 2008/0229428 A1* | 9/2008 | Camiel | G06F 17/30082 726/27 |
| 2008/0235142 A1 | 9/2008 | Gonze et al. | |
| 2008/0236370 A1* | 10/2008 | Sasaki et al. | 84/612 |
| 2008/0281689 A1* | 11/2008 | Blinnikka et al. | 705/14 |
| 2008/0288637 A1 | 11/2008 | Nagaraja et al. | |
| 2008/0320595 A1* | 12/2008 | van der Made | 726/24 |
| 2009/0055760 A1* | 2/2009 | Whatcott | G06F 8/38 715/764 |
| 2009/0063981 A1 | 3/2009 | Kikuchi et al. | |
| 2009/0076821 A1* | 3/2009 | Brenner | G06F 17/30053 704/260 |
| 2009/0077499 A1* | 3/2009 | Svendsen et al. | 715/833 |
| 2009/0093341 A1* | 4/2009 | James et al. | 482/1 |
| 2009/0144080 A1* | 6/2009 | Gray et al. | 705/2 |
| 2009/0177567 A1* | 7/2009 | McKerlich | G06Q 30/04 705/35 |
| 2009/0222809 A1* | 9/2009 | Krig | 717/171 |
| 2009/0225089 A1* | 9/2009 | Schreyer | G06T 1/60 345/506 |
| 2009/0228906 A1* | 9/2009 | Kelly | H04M 1/72522 719/328 |
| 2009/0282057 A1* | 11/2009 | Thomas | 707/100 |
| 2009/0282077 A1* | 11/2009 | Thomas | 707/104.1 |
| 2009/0319782 A1* | 12/2009 | Lee | 713/156 |
| 2010/0005531 A1* | 1/2010 | Largman et al. | 726/24 |
| 2010/0017366 A1* | 1/2010 | Robertson et al. | 707/3 |
| 2010/0107252 A1* | 4/2010 | Mertoguno | 726/23 |

\* cited by examiner

MEDIA PLAYER FRAMEWORK

This application claims priority to U.S. Provisional Patent Application No. 61/160,688 filed on Mar. 16, 2009, which is incorporated herein by reference in its entirety.

FIELD OF THE INVENTION

The various embodiments described herein relate to systems and methods for playing media content on a device.

BACKGROUND

A media player subsystem or device is capable of allowing a user to perform one or more of the following: store, access, play back, view, edit, filter, catalog, identify, or transfer media content to different types of data stores. Other services and functionality related to media content can be provided by a media player subsystem. Media player content may include audio, video, spoken, audiobook, podcast, and other forms of user experience that may be stored in a digital format. Examples of a media player system include iPod devices, Zune devices, iPod functionality on an iPhone or iPod Touch, the iTunes program, Windows Media Player, VLC, WinAmp, and many others.

As is known in the art, a framework includes a public interface (e.g., application programmer's interface (API)) usable by a programmer to create an application program or other program objects such as a daemon, a library function, a secondary framework, etc. The public interface provides access to an underlying set of data and functional services. A framework may, for example, allow a programmer using the framework to instantiate objects in a provided class, call functions, monitor framework defined events, and so on. Frameworks may be provided in many different forms, such as via a C++, ObjectiveC, or C programming language or a JavaScript, Perl, or Python scripting language interface among many others. Examples of frameworks include the iPhone SDK, the Windows SDK, the OpenGL framework, among many others.

SUMMARY

Systems and methods for managing media playback are described. In one embodiment, a third party media request is received from a third party application. A native media request can be sent to a native media player in response to the third party media request. The native media request causes the native media player to access content or metadata. Metadata can be returned to the third party application if the third party media request requested data. The native media player can perform a content operation on the content if the third party media request requested a content operation. Other embodiments are described, and media players and machine readable storage media for storing program instructions are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
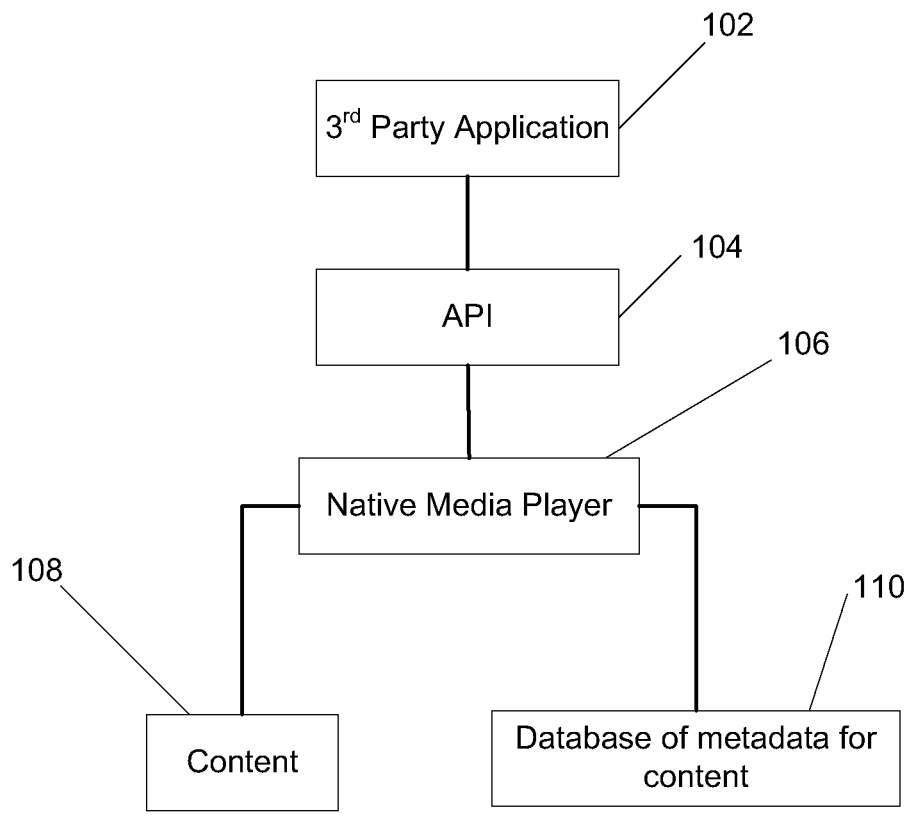
FIG. 1 is a diagram illustrating a system of managing media playback on behalf of a third party application according to an embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing information in a form readable by a machine (e.g., a computer). For example, a machine-readable medium includes read only memory ("ROM"); random access memory ("RAM"); magnetic disk storage media; optical storage media; flash memory devices; etc.

The present description includes material protected by copyrights, such as source code. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc., 2008.

Various embodiments of a media player framework are described below. Many devices provide native media player functionality, such as the iPod, the Zune, etc. The native media player is generally a trusted application provided by the manufacturer or distributor of the device, and is granted access to content (e.g., sound or video data) and metadata describing the content (e.g., song title, artist, duration, etc.) In some cases the native media player may provide an interface for modifying this metadata (e.g., change the title of a song) or content (e.g., delete a song).

Devices such as the iPod may also support third party applications, which may be acquired through portals such as Apple iTunes. The third party applications generally are not as trusted as native applications distributed by the manufacturer. For this and other security reasons, the third party applications are granted less access to content and metadata than native applications. However, without some access to content and metadata, the potential usefulness of third party applications is limited. One way of accomplishing a compromise between security and usefulness is to use a framework as a bridge between the content and the third party application.

In one embodiment, a media player framework provides an API which allows the programmer of a third party application access to content and metadata. In another embodiment, the API bridges between the third party application and a native media player. The native media player, which already has access to the content and metadata, may be used by the API to provide access to content and metadata to the third party application. In one embodiment, content is never provided to the third party application. In this embodiment, the third party application uses the API to request that the native media player play back content specified by the third party application through the API. The third party application may also request and acquire metadata describing content through the API. In this way, the third party application may provide media playback to a user.

In one embodiment, the state of the native media player may or may not change depending on the third party application utilizing the media player framework. The state of the native media player may, for example, include what song is currently playing, and whether that song should continue playing as a background process when the user switches from display of the media player to another application, such as a web browser. If, for example, the user has begun playing a song using a third party application prior to browsing the web, it would be inconvenient and nonintuitive for the song to stop playing when the user switched from the third party application to the web browser. In this embodiment, the song may continue playing in a background process of the native media player. If the user switches from the web browser back to the third party application, the interface of the third party application may indicate that the song is still playing. In another embodiment, if the user were to begin playing the song with the third party application, then switch to the web browser, and then switch to the native media player, the native media player would indicate that the current song is playing as if the user had started playing the song in the native media player originally.

Alternatively, the third party application may not change the state of the native media player. For example, if the third party application is a video game and the music (i.e., soundtrack) of the video game is drawn from the music content of the user, it may be more intuitive and appropriate to discontinue play back after the user leaves the video game. It may also be more intuitive to restore the state of the native media player, so that when the user returns to the native media player after playing the video game, the interface of the native media player represents the state of the native media player as it was the last time the user used the native media player, rather than representing the state the native media player would be in had the user played the content played by the video game in the native media player.

In another embodiment, the third party application may provide a user option allowing the user to specify whether or not the third party application changes the state of the native media player. For example, the third party application may be a media player designed for playing audiobooks. The user may use the third party application to listen to audiobooks and the native media player to listen to other audio content, such as music. The user may prefer that the audiobook state reflect the last audiobook the user listened to using the third party application (or the native media player) but that that state of the native media player not be changed, so that the last song the user listened to using the native media player is still reflected in the state of the native media player, even if the user happened to listen to an audiobook before returning to the native media player.

In another embodiment, the third party application may, in addition to user input, receive input from an accessory coupled to the device upon which the third party application is executing. The accessory may communicate with the device and/or the third party application using an external accessory framework. For example, the device may be coupled to a heart rate monitor monitoring the user's heartbeat. The third party application may receive periodic updates from the heart rate monitor. Based on changes in the heart rate and thresholds specified by the user, the third party application may use the API to change media playback in response to changes in the user's heart rate. For example, if the heart rate drops below a threshold, the third party application may play a particular song, or a song drawn from a particular list of songs. The third party application may cause a similar change, using different songs, if the heart rate begins to exceed a threshold for a particular number of data points or for a particular period of time.

FIG. 1 is a diagram illustrating one embodiment of a media player framework. Third party application 102 communicates with API 104. This communication may include calls by the third party application to functions exposed by the API 104. API 104 also communicates with native media player 106. API 104 may call functions in native media player in response to calls to API functions by third party application 102. API 104 may also invoke callback functions provided by third party application 102 in response to communication from native media player 106 (e.g., events). Native media player 106 communicates with content 108 and metadata database 110. In other embodiments, content 108 and metadata database 110 may reside in the same database or data repository.

Native media player 106 may retrieve metadata from database 110 in response to a communication from API 104. This metadata may be returned, via API 104, to third party application 102. Third party application 102 may then present this metadata to a user in a graphical format, for example, by displaying a list of songs. API 104 may also cause native media player 106 to play back content from content 108, such as a song or a video. In some embodiments, third party application 102 is prohibited from directly accessing content 108 or metadata 110. In other embodiments, third party application 102 also does not receive any content data from content 108 and content playback occurs in native media player 106.

Figure 2:
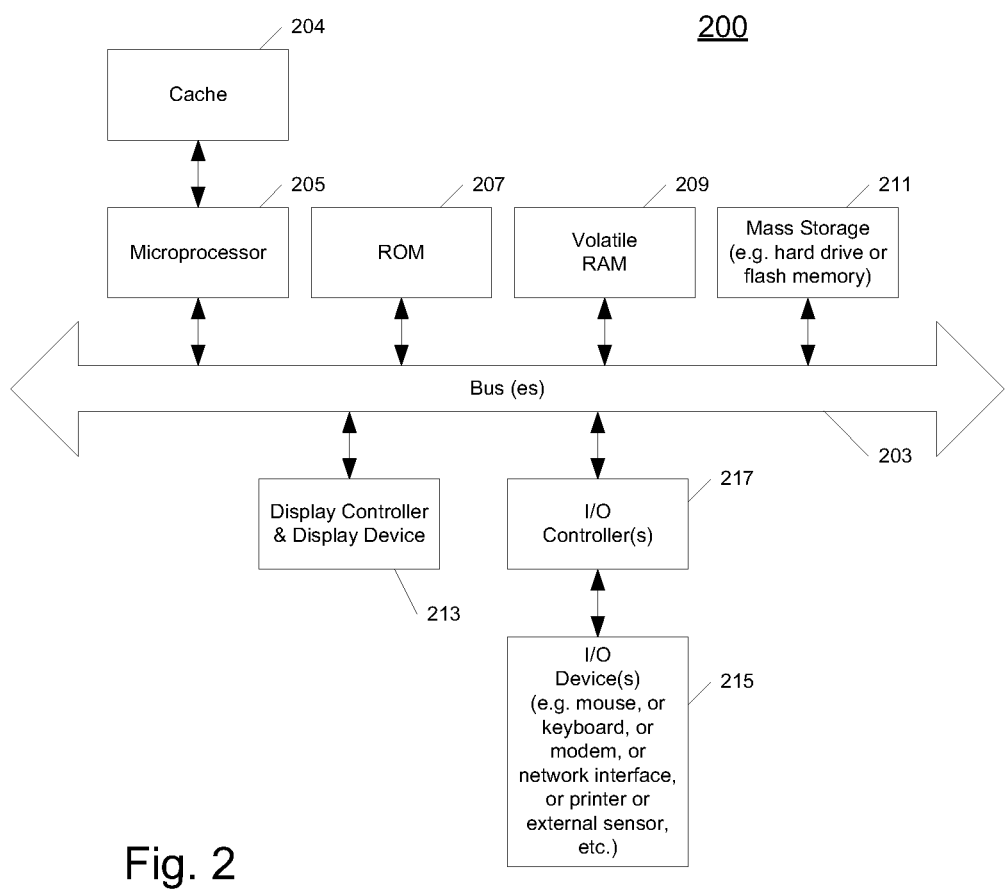
FIG. 2 is a diagram illustrating a data processing system suitable for practicing an embodiment of the invention.
Figure 3:
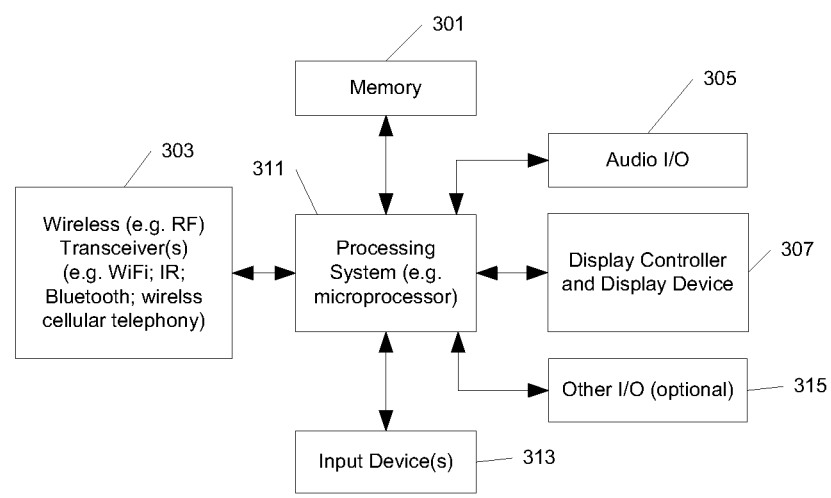
FIG. 3 is a diagram illustrating a device suitable for practicing an embodiment of the invention.

API 104 may be implemented on a data processing system or device, such as the system illustrated in FIG. 2 or the device illustrated in FIG. 3. In one embodiment, the API 104 may be a component of native media player 106. In another embodiment, the API 104 is separate from the native media player 106. The API 104 may be the exclusive way by which a third party application 102 can access native media player 106. The API 104 may also be the exclusive way by which the third party application 102 can cause playback of content stored in content 108 or acquire metadata from metadata database 110.

FIG. 2 shows one example of a data processing system which may be used with one embodiment the present invention. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 2, the computer system 200, which is a form of a data processing system, includes a bus 203 which is coupled to a microprocessor(s) 205 and a ROM (Read Only Memory) 207 and volatile RAM 209 and a mass storage 211. The microprocessor 205 is coupled to cache 204. The microprocessor 205 may retrieve the instructions from the memories 207, 209, 211 and execute the instructions to perform operations described herein. Microprocessor 205 may be coupled to optional cache 204 and store and/or retrieve instructions and/or data from cache 204. The bus 203 interconnects these various components together and also interconnects these components 205, 207, 209, and 211 to a display controller and display device 213 and to peripheral devices such as input/output (I/O) devices which may be mice, keyboards, modems, internal sensors, external sensors, network interfaces, printers and other devices which are well known in the art. Typically, the input/output devices 215 are coupled to the system through input/output controllers 217. The volatile RAM (Random Access Memory) 209 is typically implemented as dynamic RAM (DRAM) which requires power continually in order to refresh or maintain the data in the memory.

The mass storage 211 is typically a magnetic hard drive or a magnetic optical drive or an optical drive or a DVD RAM or a flash memory or other types of memory systems which maintain data (e.g. large amounts of data) even after power is removed from the system. Typically, the mass storage 211 will also be a random access memory although this is not required. While FIG. 2 shows that the mass storage 211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 203 may include one or more buses connected to each other through various bridges, controllers and/or adapters as is well known in the art.

FIG. 3 shows an example of another data processing system which may be used with one embodiment of the present invention. The data processing system 300 shown in FIG. 3 includes a processing system 311, which may be one or more microprocessors, or which may be a system on a chip integrated circuit, and the system also includes memory 301 for storing data and programs for execution by the processing system. The system 300 also includes an audio input/output subsystem 305 which may include a microphone and a speaker for, for example, playing back music or providing telephone functionality through the speaker and microphone.

A display controller and display device 307 provide a visual user interface for the user; this digital interface may include a graphical user interface which is similar to that shown on a Macintosh computer when running OS X operating system software. The system 300 also includes one or more wireless transceivers 303 to communicate with another data processing system, such as the system 200 of FIG. 2. A wireless transceiver may be a WiFi transceiver, an infrared transceiver, a Bluetooth transceiver, and/or a wireless cellular telephony transceiver. It will be appreciated that additional components, not shown, may also be part of the system 300 in certain embodiments, and in certain embodiments fewer components than shown in FIG. 3 may also be used in a data processing system.

The data processing system 300 also includes one or more input devices 313 which are provided to allow a user to provide input to the system. These input devices may be a keypad or a keyboard or a touch panel or a multi touch panel. The data processing system 300 also includes an optional input/output device 315 which may be a connector for a dock or an internal sensor (e.g., an accelerometer) or external sensor (e.g., pedometer, heart rate monitor, etc.) It will be appreciated that one or more buses, not shown, may be used to interconnect the various components as is well known in the art. The data processing system shown in FIG. 3 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 300 may be a network computer or an embedded processing device within another device, or other types of data processing systems which have fewer components or perhaps more components than that shown in FIG. 3.

Figure 4:
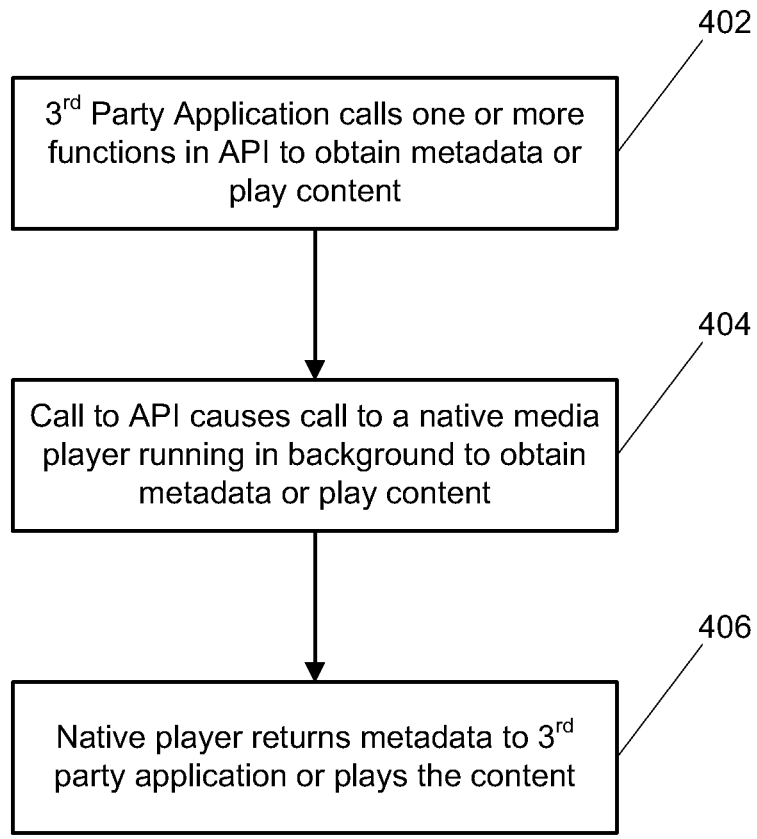
FIG. 4 is a flow chart illustrating a method of managing media playback according to an embodiment of the invention.

FIG. 4 is a flow chart illustrating a method of managing a media player framework according to an embodiment of the invention. At block 402, a third party application calls one or more functions in an API to obtain metadata or content. For example, the third party application may call an API function that returns a list of songs matching certain criteria, such as a string (e.g., a partial name of a song, artist, album, etc.). The third party application may also request playback of content using the API, such as requesting that a particular song, playlist, etc. be played. In another embodiment, the method may use a "picker" API to obtain metadata or content. For example, the "picker" API may provide functions which allow the method to cause a user interface to be presented to a user. This user interface allows the user to define the data they are requesting. Various user interface elements known in the art may be displayed by the "picker" API to allow the user to define their metadata or content request.

At block 404, the API, in response to the function call from the third party application, calls a function of the native media player. For example, the API may use an interface of the native media player available to the API but not to the third party application to acquire the requested metadata or cause the requested native media player functionality to be triggered. For example, the API may restructure query information from the third party application function call to a format useable by the native media player. The API may use the native media player interface to cause the native media player to perform content operations such as playing content, pause playing, stop playing, etc.

At block 406, the native player, in response to a request from the API, acquires the requested metadata from the metadata database and returns it to the API. The native player may also change its playback state in response to a request from the API, such as starting, pausing, or stopping playback of content.

In one embodiment, the native media player is able to initiate actions, such as sending metadata, through the API, to a third party application. For example, if a song being played by the native media player ends, the native media player may use the API to cause the API to call a callback function in the third party application to indicate that the song has ended. The callback may also include, for example, metadata describing the next song to be played.

Figure 5:
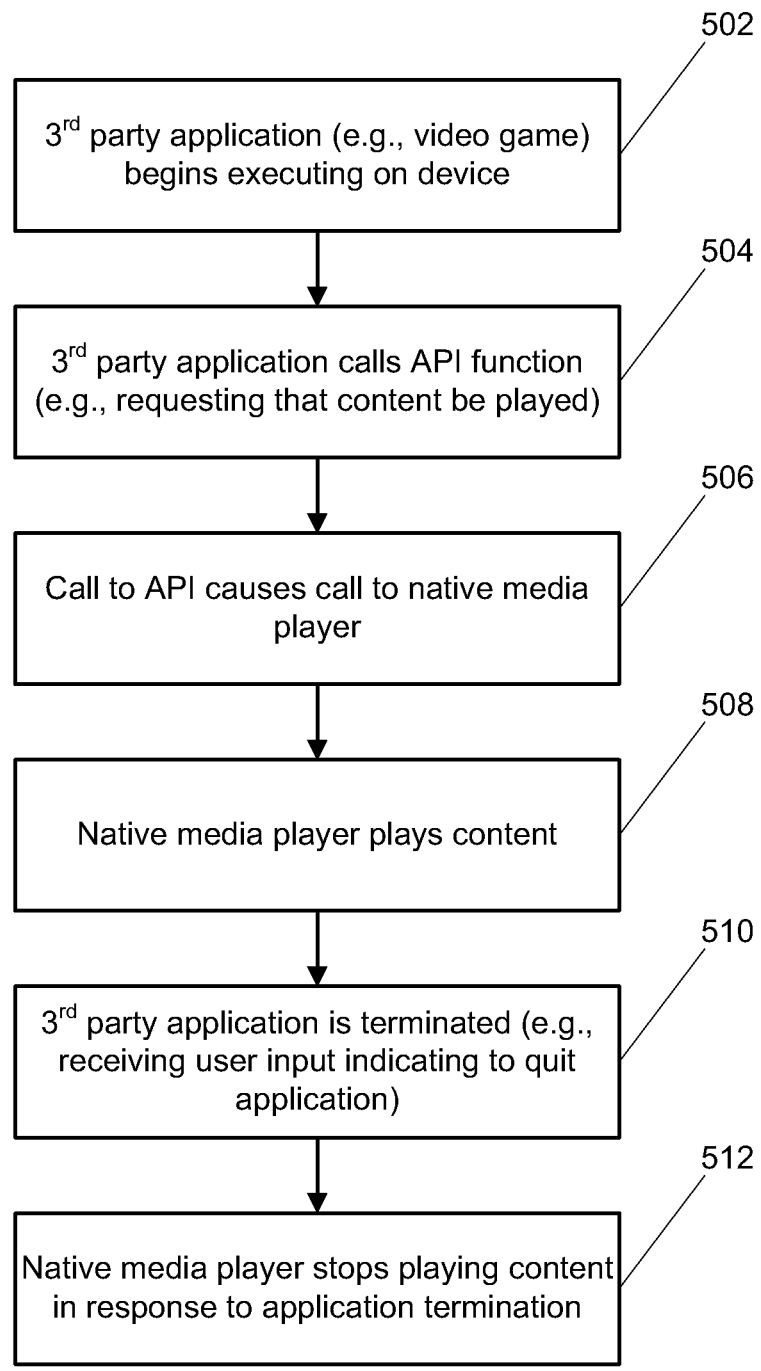
FIG. 5 is a flow chart illustrating a method of managing media playback according to another embodiment of the invention.

FIG. 5 is a flow chart illustrating a method of managing media playback for a third party application according to an embodiment of the invention. At block 502, the third party application begins executing on a device, such as the device illustrated in FIG. 3. The third party application may begin executing in response to a user input, such as touching a region of a touch pad coupled to the device. Alternatively, the third party application may be invoked by clicking a mouse on an icon displayed on a display screen, through voice input, etc.

At block 504, the third party application calls an API function in an API such as API 104 (e.g., the media player framework). The third party application calls an API function that causes a query for metadata to occur (e.g., songs with a particular substring in the name of the song). Or the third party application may call an API function that causes the native media player to play specified content.

At block 506, the API causes a call to the native media player to occur in order to bring about the data or playback requested by the third party application. At block 508, the native media player plays the requested content or acquires the requested metadata from the database and returns the metadata to the API, which returns the metadata to the third party application.

At block 510, the third party application is terminated. For example, a user causes the device to return to a home screen, which may preserve the state of the third party application before terminating the third party application.

At block 512, the native media player stops playing content in response to the termination of the third party application. For example, the third party application may be a video game using the user's own music as a soundtrack. In another embodiment, the native media player stops playing content in response to an indication that the third party application no longer requires content playback. The indication may be an API call from the third party application, detection of the third party application transitioning into the background, or the user launching the native media player. Other indications are possible.

Figure 6:
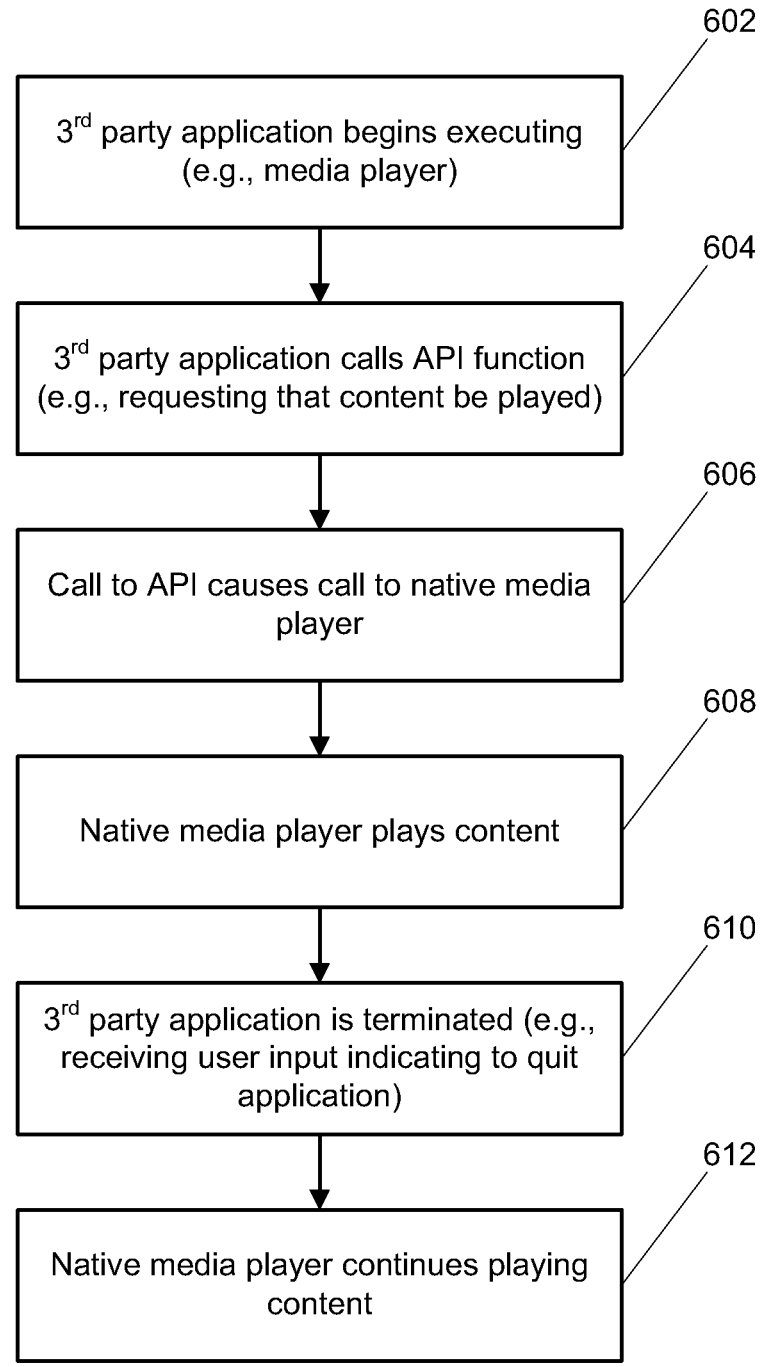
FIG. 6 is a flow chart illustrating a method of managing media playback according to yet another embodiment of the invention.

FIG. 6 is a flow chart illustrating a method of managing media playback for a third party application according to another method of the invention. At block 602, a third party application begins execution. The third party application may be, for example, a third party media player that offers a different user interface than the native media player. At block 604, the third party application calls an API function requesting that content be played, or requesting metadata to populate a list of songs, artists, etc.

At block 606, the API causes a call to the native media player which will satisfy the third party application request. At block 608, the native media player plays the requested content or returns the requested metadata.

At block 610, the third party application is terminated. The third party application may be terminated because the user has switched to a different task or a home screen. Alternatively, the user may have used a menu option to indicate to quit the application.

At block 612, the native media player continues playing the content even though the third party application has been terminated. The native media player may be running in the background. Alternatively, the native media player may now be running in the foreground.

Figure 7:
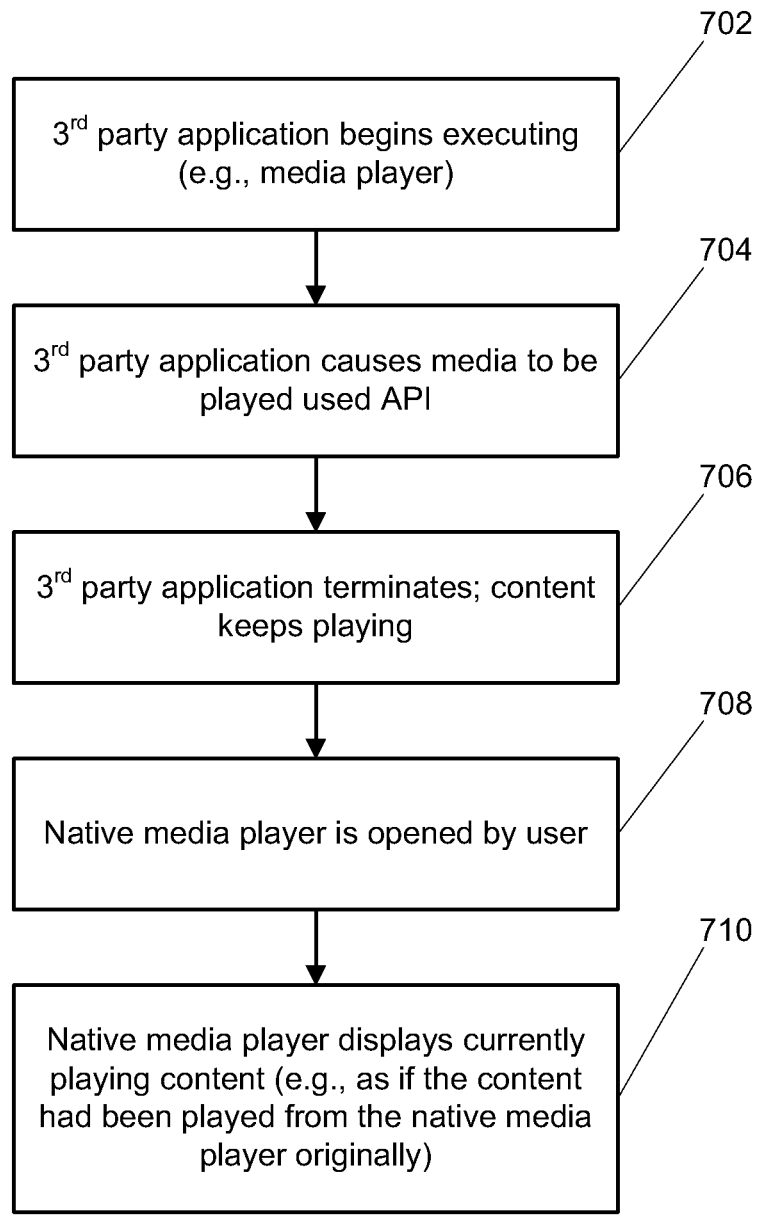
FIG. 7 is a flow chart illustrating a method managing media playback according to still another embodiment of the invention.

FIG. 7 is a flow chart illustrating a method of modifying the state of a native media player according to an embodiment of the invention. At block 702, a third party application begins executing. For example, the user may touch or click on an icon corresponding to the third party application.

At block 704, the third party application causes content to be played by the native media player using the API. At block 706, the third party application terminates and the native media player continues playing the content.

At block 708, the user opens the native media player, again by tapping or clicking on an icon, or through another way known in the art.

At block 710, the native media player displays the currently playing content in its user interface, as if playback of the content had been initiated by the native media player. In another embodiment, the native media player would display the same interface as the last time the user had used the native media player and the content would not continue playing after the third party application had terminated. In another embodiment, the native media player would query the user when the native media player was brought into the foreground or started whether the user wanted to restore the state of the native media player when the user had last directly used the native media player or if the user wanted to use the state of the native music player when the third party application terminated. In another embodiment, the native media player or the third party application provides a user option which allows the user to indicate which is to be used.

In one embodiment, the API also provides the programmer of a third party application with a user interface API. For example, the programmer of the third party application may use the API to display a song selection interface. The user may configure the song selection interface by specifying which file types should be shown, such as audiobooks, songs, video, etc. The song selection interface may be displayed within the user interface of the third party application, allowing users of the third party application to select songs or other content without requiring that the programmer of the third party application implement the selection interface.

Figure 8:
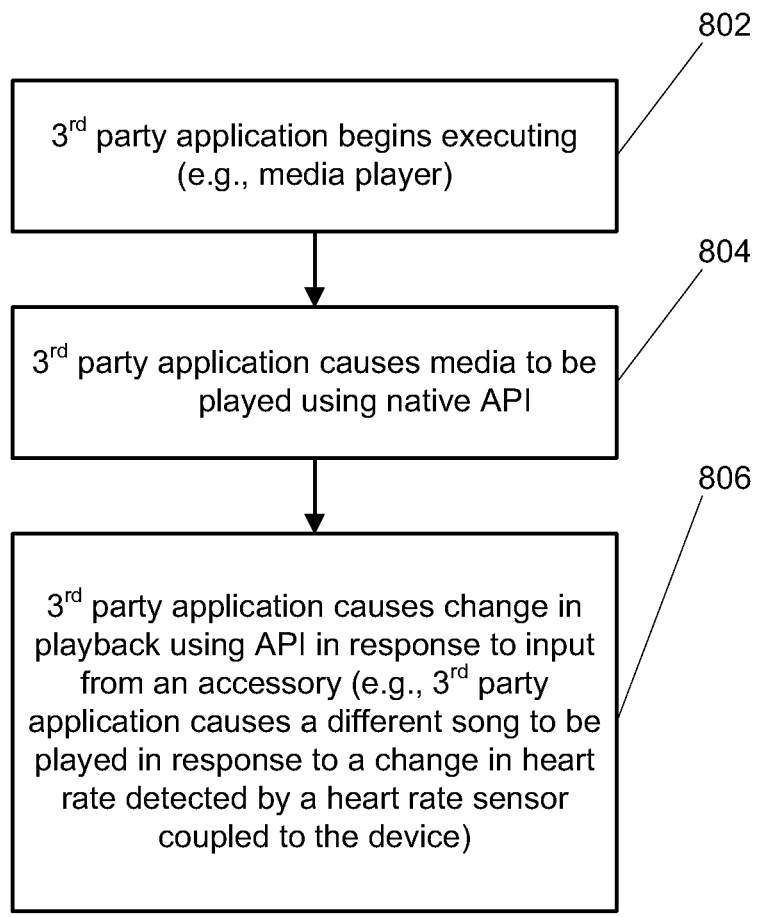
FIG. 8 is a flow chart illustrating a method of managing media playback including input from accessories according to an embodiment of the invention.

FIG. 8 is a flowchart illustrating a method of managing media playback by a third party application with input from an accessory according to an embodiment of the invention. At block 802, the third party application begins executing (e.g., because the user started it.) At block 804, the third party application causes media to be played using an API.

At block 806, the third party application uses the API to change the playback of content in response to receiving input from an accessory. For example, the third party application may receive periodic data points from a heart rate monitor. Based on changes in these data points, the third party application may cause different content to be played.

In the following, a media player framework embodiment is described. In this embodiment, the public interface provides access to data and services generally related to the operation of a media player subsystem on a device.

In this section, an Objective C source code listing of header files in one embodiment of a media player framework is provided. Each header file is also described. It should be clear that the described embodiment is an exemplary set of ways of implementing the described interface to a media player framework. While a few alternatives to the embodiment listed in the header files will be described, it should be apparent to the artisan that a practically limitless number of variations of choices for data and variables may be instantiated via an interface of this type, of programming language, syntax, names, parameter choice, and other details are available to implement interfaces like those exemplified below.

Furthermore, many types of details in the provided headers may be different in other embodiments. Specifically, the media types listed here do not include video types. In other embodiments, video types may be present. Furthermore, in other embodiments, podcasts, or audiobooks, or some other categories defined below may not be present. Other forms of media may also be provided, including ebooks, video games, and the like.

For other media forms different media properties would be relevant. For example, if movie media were provided, actors, directors, etc. may be included in metadata about the media. In other embodiments, properties defined below may not be included or may be differently structured (e.g., rating may be a string and not numeric). Database management functions for media library management may differ in other embodiments. Playlists may or may not be provided, or be known via different terminology. Query forms and predicates may be different, especially if, for example, video, ebook, or game content is provided in other embodiments.

Music player control and states may vary in other embodiments and some of the controls and states may be absent. A repeat mode may not be available. Other shuffle modes such as shuffle within a genre, or artist, or others not listed may be available. Some embodiments may exclude shuffle modes. Navigation may be available in modes unlike those described below. Event notifications may be absent or the events may differ in some embodiments.

Many other variations, changes, omissions and additions are possible. The descriptions and header files for an exemplary embodiment are now provided.

Media Item Interface

This interface definition for a media item interface provides an enumerated type MPMediaType which represents a media type. The media type may be one of four possible values, a music, podcast, audio book or other audio, or any other not in those four categories.

An MPMediaItem is defined. It represents a single piece of media in an MPMediaLibrary. Media items have a unique identifier which persists across application launches. The canFilterByProperty function returns YES for item properties which can be used to construct MPMediaPropertyPredicates. The valueForProperty function returns the value for the given item property. The MPMediaItemArtwork class is defined as an image with size attributes and the following properties: CGRect bounds, a rectangle defining the bounds of the full size image, and CGRect imageCropRect, a crop rectangle in the bounds of the full size image. Additional item properties form metadata about an MPMediaItem. Properties marked filterable can also be used to build MPMediaPropertyPredicates, that is, they may be used to form search queries.

In this embodiment, filterable media properties available in the interface to the media can include:

1. a string, MPMediaItemPersistentID;
2. a MPMediaType, MPMediaItemPropertyMediaType the media type as defined above;
3. a string MPMediaItemPropertyTitle, the media item title;
4. a string, MPMediaItemPropertyPodcastTitle for a podcast Title
5. a string MPMediaItemPropertyAlbumTitle, an album title;
6. a string MPMediaItemPropertyArtist, an artist name;
7. a string MPMediaItemPropertyAlbumArtist, an album artist name;
8. a string MPMediaItemPropertyGenre, a media item genre;
9. a string MPMediaItemPropertyComposer, a composer; and
10. a boolean MPMediaItemPropertyIsCompilation indicating whether the item is part of a compilation Other media properties can include:

1. a number MPMediaItemPropertyPlaybackDuration, a playback duration
2. a number MPMediaItemPropertyAlbumTrackNumber, an album track number;
3. a number MPMediaItemPropertyAlbumTrackCount, an album track count;
4. a number MPMediaItemPropertyDiscNumber, a disc number;
5. a number MPMediaItemPropertyDiscCount, a disc count
6. an item of class MPMediaItemArtwork, defined above, MPMediaItemPropertyArtwork, the item artwork;
7. a string MPMediaItemPropertyLyrics for lyrics
8. a number, MPMediaItemPropertyPlayCount for the number of times an item has been played;
9. a number, MPMediaItemPropertySkipCount, for the number of times an item has been skipped;
10. a number MPMediaItemPropertyRating for a numeric rating; and
11. a date, MPMediaItemPropertyLastPlayedDate for a last played date.

The listing of a header file for this embodiment appears below:

```
//
// MPMediaItem.h
// MediaPlayer
//
// Copyright 2008 Apple, Inc. All rights reserved.
//
#import <Foundation/Foundation.h>
#import <CoreGraphics/CoreGraphics.h>
#import <MediaPlayer/MediaPlayerDefines.h>
@class MPMediaItemArtworkInternal, MPMediaItemInternal, UIImage;
enum {
   // audio
   MPMediaTypeMusic       = 1 << 0,
   MPMediaTypePodcast     = 1 << 1,
   MPMediaTypeAudioBook   = 1 << 2,
   MPMediaTypeAnyAudio    = 0x00ff,
   MPMediaTypeAny         = ~0
};
typedef NSInteger MPMediaType;
// An MPMediaItem represents a single piece of media in an MPMediaLibrary.
// Media items have a unique identifier which persists across application launches.
MP_EXTERN_CLASS @interface MPMediaItem : NSObject <NSCoding> {
@private
   MPMediaItemInternal *_internal;
}
// Returns YES for item properties which can be used to construct MPMediaPropertyPredicates.
+ (BOOL)canFilterByProperty:(NSString *)property;
// Returns the value for the given item property, see the item properties listing below.
- (id)valueForProperty:(NSString *)property;
@end
//--------------------------------------------------
MP_EXTERN_CLASS @interface MPMediaItemArtwork : NSObject {
@private
   MPMediaItemArtworkInternal *_internal;
}
- (UIImage *)imageWithSize:(CGSize)size;
@property(nonatomic, readonly) CGRect bounds; // the bounds of the full size image
@property(nonatomic, readonly) CGRect imageCropRect; // in the bounds of the full size image
@end
// --------------------------------------------------
// Item properties can be used with -valueForProperty: to fetch metadata about an MPMediaItem.
// Properties marked filterable can also be used to build MPMediaPropertyPredicates (see MPMediaQuery.h).
// Media properties
MP_EXTERN NSString *const MPMediaItemPropertyPersistentID;       // @"persistentID",      NSNumber of uint64_t (unsigned long long), filterable
MP_EXTERN NSString *const MPMediaItemPropertyMediaType;          // @"mediaType",         NSNumber of MPMediaType (NSInteger), filterable
MP_EXTERN NSString *const MPMediaItemPropertyTitle;              // @"title", NSString, filterable
MP_EXTERN NSString *const MPMediaItemPropertyAlbumTitle;         // @"albumTitle",        NSString, filterable
MP_EXTERN NSString *const MPMediaItemPropertyArtist;             // @"artist",            NSString, filterable
MP_EXTERN NSString *const MPMediaItemPropertyAlbumArtist;        // @"albumArtist",       NSString, filterable
MP_EXTERN NSString *const MPMediaItemPropertyGenre;              // @"genre", NSString, filterable
MP_EXTERN NSString *const MPMediaItemPropertyComposer;           // @"composer",          NSString, filterable
MP_EXTERN NSString *const MPMediaItemPropertyPlaybackDuration;   // @"playbackDuration",  NSNumber of NSTimeInterval (double)
MP_EXTERN NSString *const MPMediaItemPropertyAlbumTrackNumber;   // @"albumTrackNumber",  NSNumber of NSUInteger
MP_EXTERN NSString *const MPMediaItemPropertyAlbumTrackCount;    // @"albumTrackCount",   NSNumber of NSUInteger
MP_EXTERN NSString *const MPMediaItemPropertyDiscNumber;         // @"discNumber",        NSNumber of NSUInteger
```

-continued

```
MP_EXTERN NSString *const MPMediaItemPropertyDiscCount;         //
@"discCount",           NSNumber of NSUInteger
MP_EXTERN NSString *const MPMediaItemPropertyArtwork;           //
@"artwork",             MPMediaItemArtwork
MP_EXTERN NSString *const MPMediaItemPropertyLyrics;            //
@"lyrics",              NSString
MP_EXTERN NSString *const MPMediaItemPropertyIsCompilation;     //
@"isCompilation",       NSNumber of BOOL,
filterable
// Podcast properties
MP_EXTERN NSString *const MPMediaItemPropertyPodcastTitle;      //
@"podcastTitle",        NSString,
filterable
// User properties
MP_EXTERN NSString *const MPMediaItemPropertyPlayCount;         //
@"playCount",           NSNumber of NSUInteger
MP_EXTERN NSString *const MPMediaItemPropertySkipCount;         //
@"skipCount",           NSNumber of NSUInteger
MP_EXTERN NSString *const MPMediaItemPropertyRating;            //
@"rating",              NSNumber of NSUInteger, 0...5
MP_EXTERN NSString *const MPMediaItemPropertyLastPlayedDate;    //
@"lastPlayedDate",      NSDate
```

Media Library Interface

A MediaLibrary class MPMediaLibrary represents a collection of media on a device, and can be used to fetch items and playlists from the user's synced iTunes library in this embodiment. The lastModifiedDate property returns the date at which the media library was last modified. An event MPMediaLibraryDidChangeNotification will be posted when a sync happens. The following functions control the enabling and disabling of this event: beginGeneratingLibraryChangeNotifications; and endGeneratingLibraryChangeNotifications. Any items or playlists which were previously cached should be re-evaluated from queries when MPMediaLibraryDidChangeNotification is posted. The listing of a header file for this interface appears below:

```
//
//    MPMediaLibrary.h
//    MediaPlayer
//
//    Copyright 2008 Apple, Inc. All rights reserved.
//
#import <Foundation/Foundation.h>
#import <MediaPlayer/MediaPlayerDefines.h>
@class MPMediaLibraryInternal, MPMediaQuery;
// MPMediaLibrary represents a collection of media on a device, and can
be used to fetch items and playlists from the user's synced
iTunes library.
// See MPMediaQuery.h for a list of common queries or to build a custom
query from a chain of filter predicates.
MP_EXTERN_CLASS @interface MPMediaLibrary : NSObject {
@private
    MPMediaLibraryInternal *_internal;
}
+ (MPMediaLibrary *)defaultMediaLibrary;
// Returns the date at which the media library was last modified.
@property(nonatomic, readonly) NSDate *lastModifiedDate;
// MPMediaLibraryDidChangeNotification will be posted when a sync
happens.
- (void)beginGeneratingLibraryChangeNotifications;
- (void)endGeneratingLibraryChangeNotifications;
@end
// Any items or playlists which were previously cached should be re-
evaluated from queries when MPMediaLibraryDidChangeNotification
is posted.
MP_EXTERN NSString *const MPMediaLibraryDidChangeNotification;
```

MediaPlaylist Interface

A playlist may have a MPMediaPlaylistAttribute associated with it. The value of the attribute may include:

1. MPMediaPlaylistAttributeNone (no attributes);
2. MPMediaPlaylistAttributeOnTheGo (created on a device and not by syncing with iTunes);
3. MPMediaPlaylistAttributeSmart (created using the Smart Playlist feature of iTunes); and
4. MPMediaPlaylistAttributeGenius (created using the Genius feature of iTunes).

An MPMediaPlaylist is a collection of related MPMediaItems in an MPMediaLibrary. Playlists have a unique identifier which persists across application launches. The canFilterByProperty function returns YES for item properties which can be used to construct MPMediaPropertyPredicates. The valueForProperty property returns the value for the given item property. Playlist properties can be used with valueForProperty to fetch metadata about an MPMediaPlaylist. Properties marked filterable can also be used to build queries and MPMediaPropertyPredicates. The following are defined:

1. A number MPMediaPlaylistPropertyPersistentID, a playlist persistent ID", NSNumber of uint64_t (unsigned long long), filterable
2. A string MPMediaPlaylistPropertyName, a playlist name;
3. a set, MPMediaPlaylistPropertyPlaylistAttributes, playlist attributes.

Also, MPMediaPlaylistPropertySeedItems are defined. For playlists with attribute MPMediaPlaylistAttributeGenius, the seedItems are the MPMediaItems which were used to the generate the playlist. This is nil for playlists without MPMediaPlaylistAttributeGenius set. The listing of a header file for this interface appears below:

```
//
//    MPMediaPlaylist.h
//    MediaPlayer
//
//    Copyright 2008 Apple, Inc. All rights reserved.
//
#import <Foundation/Foundation.h>
#import <MediaPlayer/MediaPlayerDefines.h>
#import <MediaPlayer/MPMediaItemCollection.h>
@class MPMediaItem, MPMediaPlaylistInternal;
// A playlist may have any number of MPMediaPlaylistAttributes
associated.
```

```
enum {
    MPMediaPlaylistAttributeNone     = 0,
    MPMediaPlaylistAttributeOnTheGo  = (1 << 0), // if set, the
playlist was created on a device rather than synced from iTunes
    MPMediaPlaylistAttributeSmart    = (1 << 1),
    MPMediaPlaylistAttributeGenius   = (1 << 2)
};
typedef NSInteger MPMediaPlaylistAttribute;
// An MPMediaPlaylist is a collection of related MPMediaItems in an
MPMediaLibrary.
// Playlists have a unique identifier which persists across application
launches.
MP_EXTERN_CLASS @interface MPMediaPlaylist :
MPMediaItemCollection {
@private
    MPMediaPlaylistInternal *_playlistInternal;
}
// Returns YES for item properties which can be used to construct
MPMediaPropertyPredicates.
+ (BOOL)canFilterByProperty:(NSString *)property;
// Returns the value for the given item property, see the playlist
properties listing below.
- (id)valueForProperty:(NSString *)property;
@end
// Playlist properties can be used with -valueForProperty: to fetch
metadata about an MPMediaPlaylist.
// Properties marked filterable can also be used to build
MPMediaPropertyPredicates (see MPMediaQuery.h).
MP_EXTERN NSString *const MPMediaPlaylistPropertyPersistentID; //
@"playlistPersistentID",   NSNumber of uint64_t (unsigned long long),
filterable
MP_EXTERN NSString *const MPMediaPlaylistPropertyName;     //
@"name",            NSString,
filterable
MP_EXTERN NSString *const
MPMediaPlaylistPropertyPlaylistAttributes;                    //
@"playlistAttributes",    NSNumber of MPMediaPlaylistAttribute
(NSInteger),       filterable
// For playlists with attribute MPMediaPlaylistAttributeGenius, the
seedItems are the MPMediaItems which were used to the generate the
playlist.
// Returns nil for playlists without MPMediaPlaylistAttributeGenius set.
MP_EXTERN NSString *const MPMediaPlaylistPropertySeedItems; //
@"seedItems",           NSArray of MPMediaItems
```

Media Query Interface

An MPMediaGrouping type is defined, and it can be one of:
1. MPMediaGroupingTitle,
2. MPMediaGroupingAlbum,
3. MPMediaGroupingArtist,
4. MPMediaGroupingAlbumArtist,
5. MPMediaGroupingComposer,
6. MPMediaGroupingGenre,
7. MPMediaGroupingPlaylist,
8. MPMediaGroupingPodcastTitle A MPMediaQuery object represents a collection of items or playlists determined by a chain of MPMediaPredicate objects. The methods initWithFilterPredicates, addFilterPredicate, removeFilterPredicate return an array of MPMediaItems matching the query filter predicates that are currently active on the media items in a collection. If no items match this method returns an empty array, otherwise returns nil if an error prevents the items from being fetched. An array of items, collection, or media groupings may be returned. Base queries which can be used directly or as the basis for custom queries are listed below. The groupingType for these queries is preset to the appropriate type for the query, which include:
1. albumsQuery;
2. artistsQuery;
3. songsQuery;
4. playlistsQuery;
5. podcastsQuery;
6. audiobooksQuery;
7. compilationsQuery;
8. composersQuery;
9. genresQuery;

MPMediaPredicate is an abstract class that allows filtering media in an MPMediaQuery. MPMediaPropertyPredicate allows filtering based on a specific property value of an item or collection. Other supporting properties are defined in the interface. The listing of a header file for this interface appears below:

```
//
//  MPMediaQuery.h
//  MediaPlayer
//
//  Copyright 2008 Apple, Inc. All rights reserved.
//
#import <Foundation/Foundation.h>
#import <MediaPlayer/MediaPlayerDefines.h>
@class MPMediaQueryInternal, MPMediaPredicate,
MPMediaPropertyPredicateInternal;
enum {
    MPMediaGroupingTitle,
    MPMediaGroupingAlbum,
    MPMediaGroupingArtist,
    MPMediaGroupingAlbumArtist,
    MPMediaGroupingComposer,
    MPMediaGroupingGenre,
    MPMediaGroupingPlaylist,
    MPMediaGroupingPodcastTitle
};
typedef NSInteger MPMediaGrouping;
// MPMediaQuery represents a collection of items or playlists determined by
a chain of MPMediaPredicate objects.
MP_EXTERN_CLASS @interface MPMediaQuery : NSObject <NSCoding> {
@private
    MPMediaQueryInternal *_internal;
}
- (id)init;
- (id)initWithFilterPredicates:(NSSet *)filterPredicates;
```

```
@property(nonatomic, retain) NSSet *filterPredicates;
- (void)addFilterPredicate:(MPMediaPredicate *)predicate;
- (void)removeFilterPredicate:(MPMediaPredicate *)predicate;
// Returns an array of MPMediaItems matching the query filter predicates.
// If no items match this method returns an empty array, otherwise returns
nil if an error prevents the items from being fetched.
@property(nonatomic, readonly) NSArray *items;
// Returns an array of MPMediaItemCollections matching the query filter
predicates. The collections are grouped by the groupingType.
@property(nonatomic, readonly) NSArray *collections;
// The property used to group collections, defaults to
MPMediaGroupingTitle.
@property(nonatomic) MPMediaGrouping groupingType;
// Base queries which can be used directly or as the basis for custom
queries.
// The groupingType for these queries is preset to the appropriate type for
the query.
+ (MPMediaQuery *)albumsQuery;
+ (MPMediaQuery *)artistsQuery;
+ (MPMediaQuery *)songsQuery;
+ (MPMediaQuery *)playlistsQuery;
+ (MPMediaQuery *)podcastsQuery;
+ (MPMediaQuery *)audiobooksQuery;
+ (MPMediaQuery *)compilationsQuery;
+ (MPMediaQuery *)composersQuery;
+ (MPMediaQuery *)genresQuery;
@end
// -----------------------------------------------------------------------
// MPMediaPredicate is an abstract class that allows filtering media in an
MPMediaQuery.
// See the concrete subclass MPMediaPropertyPredicate for filtering
options.
MP_EXTERN_CLASS @interface MPMediaPredicate : NSObject <NSCoding> { }
@end
// -----------------------------------------------------------------------
// MPMediaPropertyPredicate allows filtering based on a specific property
value of an item or collection.
// See MPMediaItem.h and MPMediaPlaylist.h for a list of properties.
enum {
    MPMediaPredicateComparisonEqualTo,
    MPMediaPredicateComparisonContains
};
typedef NSInteger MPMediaPredicateComparison;
MP_EXTERN_CLASS @interface MPMediaPropertyPredicate : MPMediaPredicate {
@private
    MPMediaPropertyPredicateInternal *_internal;
}
+ (MPMediaPropertyPredicate *)predicateWithValue:(id)value
forProperty:(NSString *)property; // comparisonType is
MPMediaPredicateComparisonEqualTo
+ (MPMediaPropertyPredicate *)predicateWithValue:(id)value
forProperty:(NSString *)property
comparisonType:(MPMediaPredicateComparison)comparisonType;
@property(nonatomic, readonly, copy) NSString *property;
@property(nonatomic, readonly, copy) id value;
@property(nonatomic, readonly) MPMediaPredicateComparison comparisonType;
@end
```

Media Item Collection Interface

A MPMediaItemCollection is a collection of related MPMediaItems in a media library. The function collectionWithItems creates a media item collection by copying an array of MPMediaItems. The property items returns the MPMediaItems in the collection. The property representativeItem returns an item representative of other items in the collection. This item can be used for common item properties in the collection. Property count returns the number of items in the collection. In some cases, this can be more efficient than fetching the items array and asking for the count. Property mediaTypes returns the types of media which the collection holds. The listing of a header file for this interface appears below:

```
//
// MPMediaItemCollection.h
// MediaPlayer
//
// Copyright 2008 Apple, Inc. All rights reserved.
//
#import <Foundation/Foundation.h>
#import <MediaPlayer/MediaPlayerDefines.h>
#import <MediaPlayer/MPMediaItem.h>
@class MPMediaItemCollectionInternal;
// An MPMediaItemCollection is a collection of related MPMediaItems
in a media library.
MP_EXTERN_CLASS @interface MPMediaItemCollection :
NSObject <NSCoding> {
@private
    MPMediaItemCollectionInternal *_internal;
}
```

-continued

```
// Creates a media item collection by copying an array of MPMediaItems.
+ (MPMediaItemCollection *)collectionWithItems:(NSArray *)items;
- (id)initWithItems:(NSArray *)items;
// Returns the MPMediaItems in the collection.
@property(nonatomic, readonly) NSArray *items;
// Returns an item representative of other items in the collection.
// This item can be used for common item properties in the collection,
often more efficiently than fetching an item out of the items array.
@property(nonatomic, readonly) MPMediaItem *representativeItem;
// Returns the number of items in the collection.
// In some cases, this is more efficient than fetching the items array and
asking for the count.
@property(nonatomic, readonly) NSUInteger count;
// Returns the types of media which the collection holds.
@property(nonatomic, readonly) MPMediaType mediaTypes;
@end
```

MusicPlayerController Interface

A playlist may have a MPMusicPlaybackState associated with it. The value of the state may include: stopped, playing, paused, interrupted, seeking forward, and seeking backward. These states may be enumerated as:
1. MPMusicPlaybackStateStopped
2. MPMusicPlaybackStatePlaying,
3. MPMusicPlaybackStatePaused,
4. MPMusicPlaybackStateInterrupted,
5. MPMusicPlaybackStateSeekingForward,
6. MPMusicPlaybackStateSeekingBackward A playlist may have a MPMusicRepeatMode associated with it. The value of the mode may include: default, none, one, and all. These modes may be enumerated as:
1. MPMusicRepeatModeDefault
2. MPMusicRepeatModeNone,
3. MPMusicRepeatModeOne,
4. MPMusicRepeatModeAll A user preference data item may have a MPMusicShuffleMode associated with it. The value of the mode may include: default, off, songs and albums. These modes may be enumerated as:
1. MPMusicShuffleModeDefault
2. MPMusicShuffleModeOff
3. MPMusicShuffleModeSongs
4. MPMusicShuffleModeAlbums The MPMusicPlayerController class allows playback of MPMediaItems through the iPod application. Playing media items with the applicationMusicPlayer interface will restore the user's iPod state after the application quits. Playing media items with the iPodMusicPlayer interface will replace the user's current iPod state. The property playbackState returns the current playback state of the music player. The property repeatMode returns how music repeats after playback completes and defaults to MPMusicRepeatModeDefault. The property shuffleMode returns how music is shuffled when playing and defaults to MPMusicShuffleModeDefault. The property volume returns current volume of playing music, in the range of 0.0 to 1.0. The property nowPlayingItem returns the currently playing media item, or nil if none is playing. Setting the nowPlayingItem to an item in the current queue will begin playback at that item. Calling function play will begin playback after setting an item queue source. The functions setQueueWithQuery and setQueueWithItemCollection respectively set the queue up based on either a query or on an item collection.

Function play plays items from the current queue, resuming paused playback if possible. Function pause pauses playback if the music player is playing. Function stop ends playback. Calling play again will start from the beginning of the queue. The property currentPlaybackTime returns the currentPlaybackTime. Functions beginSeekingForward, beginSeekingBackward and endSeeking control seeking within an item. The seeking rate will increase the longer seeking is active. Function skipToNextItem skips to the next item in the queue. If it is already at the last item, this will end playback. Function skipToBeginning restarts playback at the beginning of the currently playing media item. Function skipToPreviousItem skips to the previous item in the queue. If already at the first item, this will end playback.

These methods determine whether playback notifications will be generated. Calls to begin/endGeneratingPlaybackNotifications are nestable: beginGeneratingPlaybackNotifications and endGeneratingPlaybackNotifications. The following event is posted when the playback state changes, either programmatically or by the user: MPMusicPlayerControllerPlaybackStateDidChangeNotification. The following event is posted when the currently playing media item changes: MPMusicPlayerControllerNowPlayingItemDidChangeNotification. The following event is posted when the current volume changes: MPMusicPlayerControllerVolumeDidChangeNotification. The listing of a header file for this interface appears below:

```
//
//   MPMusicPlayerController.h
//   MediaPlayer
//
//   Copyright 2008 Apple, Inc. All rights reserved.
//
#import <Foundation/Foundation.h>
#import <MediaPlayer/MediaPlayerDefines.h>
#import <MediaPlayer/MPMediaItemCollection.h>
@class MPMediaItem, MPMediaQuery,
MPMusicPlayerControllerInternal;
enum {
    MPMusicPlaybackStateStopped,
    MPMusicPlaybackStatePlaying,
    MPMusicPlaybackStatePaused,
    MPMusicPlaybackStateInterrupted,
    MPMusicPlaybackStateSeekingForward,
    MPMusicPlaybackStateSeekingBackward
};
typedef NSInteger MPMusicPlaybackState;
enum {
    MPMusicRepeatModeDefault, // the user's preference for
    repeat mode
    MPMusicRepeatModeNone,
    MPMusicRepeatModeOne,
    MPMusicRepeatModeAll
};
typedef NSInteger MPMusicRepeatMode;
enum {
    MPMusicShuffleModeDefault, // the user's preference for
    shuffle mode
    MPMusicShuffleModeOff,
    MPMusicShuffleModeSongs,
    MPMusicShuffleModeAlbums
};
typedef NSInteger MPMusicShuffleMode;
// MPMusicPlayerController allows playback of MPMediaItems
through the iPod application.
MP_EXTERN_CLASS @interface MPMusicPlayerController :
NSObject {
    MPMusicPlayerControllerInternal *_internal;
}
// Playing media items with the applicationMusicPlayer will restore the
user's iPod state after the application quits.
+ (MPMusicPlayerController *)applicationMusicPlayer;
// Playing media items with the iPodMusicPlayer will replace the user's
current iPod state.
```

-continued

```
+ (MPMusicPlayerController *)iPodMusicPlayer;
@end
@interface MPMusicPlayerController (MPPlaybackControl)
// Returns the current playback state of the music player
@property(nonatomic, readonly) MPMusicPlaybackState playbackState;
// Determines how music repeats after playback completes. Defaults to
MPMusicRepeatModeDefault.
@property(nonatomic) MPMusicRepeatMode repeatMode;
// Determines how music is shuffled when playing. Defaults to
MPMusicShuffleModeDefault.
@property(nonatomic) MPMusicShuffleMode shuffleMode;
// The current volume of playing music, in the range of 0.0 to 1.0.
@property(nonatomic) float volume;
// Returns the currently playing media item, or nil if none is playing.
// Setting the nowPlayingItem to an item in the current queue will begin
playback at that item.
@property(nonatomic, copy) MPMediaItem *nowPlayingItem;
// Call -play to begin playback after setting an item queue source.
- (void)setQueueWithQuery:(MPMediaQuery *)query;
- (void)setQueueWithItemCollection:(MPMediaItemCollection
*)itemCollection;
// Plays items from the current queue, resuming paused playback if
possible.
- (void)play;
// Pauses playback if the music player is playing.
- (void)pause;
// Ends playback. Calling -play again will start from the beginnning of
the queue.
- (void)stop;
// The current time of the now playing item in seconds.
@property(nonatomic) NSTimeInterval currentPlaybackTime;
// The seeking rate will increase the longer seeking is active.
- (void)beginSeekingForward;
- (void)beginSeekingBackward;
- (void)endSeeking;
// Skips to the next item in the queue. If already at the last item, this
will end playback.
- (void)skipToNextItem;
// Restarts playback at the beginning of the currently playing media item.
- (void)skipToBeginning;
// Skips to the previous item in the queue. If already at the first item,
this will end playback.
- (void)skipToPreviousItem;
// These methods determine whether playback notifications will be
generated.
// Calls to begin/endGeneratingPlaybackNotifications are nestable.
- (void)beginGeneratingPlaybackNotifications;
- (void)endGeneratingPlaybackNotifications;
@end
// Posted when the playback state changes, either programatically or by the
user.
MP_EXTERN NSString *const
MPMusicPlayerControllerPlaybackStateDidChangeNotification;
// Posted when the currently playing media item changes.
MP_EXTERN NSString *const
MPMusicPlayerControllerNowPlayingItemDidChangeNotification;
```

Media Picker Controller interface

The MPMediaPickerController class is a UIViewController for visually selecting media items. To display it, it is presented modally on an existing view controller. It may be initialized with one of the previously defined media types. The property allowsPickingMultipleItems can be set, its default is NO. Setting a prompt property displays a prompt for the user above the navigation bar buttons. A protocol MPMediaPickerControllerDelegate is defined. It is the delegate's responsibility to dismiss the modal view controller on the parent view controller. The additional states are available: mediaPicker, didPickMediaItem, and mediaPickerDidCancel. The listing of a header file for this embodiment appears below:

```
//
//  MPMediaPickerController.h
//  MediaPlayer
//
//  Copyright 2008 Apple, Inc. All rights reserved.
//
#import <Foundation/Foundation.h>
#import <UIKit/UIKit.h>
#import <MediaPlayer/MediaPlayerDefines.h>
#import <MediaPlayer/MPMediaItem.h>
#import <MediaPlayer/MPMediaItemCollection.h>
@class MPMediaPickerControllerInternal;
@protocol MPMediaPickerControllerDelegate;
// MPMediaPickerController is a UIViewController for visually selecting
media items.
// To display it, present it modally on an existing view controller.
MP_EXTERN_CLASS @interface MPMediaPickerController :
UIViewController {
@private
    MPMediaPickerControllerInternal *_internal;
}
- (id)init; // defaults to MPMediaTypeAny
- (id)initWithMediaTypes:(MPMediaType)mediaTypes;
@property(nonatomic, readonly) MPMediaType mediaTypes;
@property(nonatomic, assign) id<MPMediaPickerControllerDelegate>
delegate;
@property(nonatomic) BOOL allowsPickingMultipleItems; // default
is NO
@property(nonatomic, copy) NSString *prompt; // displays a prompt
for the user above the navigation bar buttons
@end
@protocol MPMediaPickerControllerDelegate<NSObject>
@optional
// It is the delegate's responsibility to dismiss the modal view controller
on the parent view controller.
- (void)mediaPicker:(MPMediaPickerController *)mediaPicker
didPickMediaItems:(MPMediaItemCollection *)mediaItemCollection;
- (void)mediaPickerDidCancel:(MPMediaPickerController
*)mediaPicker;
@end
```

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus comprising:
   means for receiving a third party media request from a third party application executing on a hardware device, the third party media request requesting access to content and metadata by a native media player on behalf of the third party application, and received through an application programmer interface that provides calls to operations of the native media player, the native media player executing on the hardware device;
   means for converting the third party media request into a native media player request configured to cause the native media player to perform a content operation on the content on behalf of the third party application when the third party application is prohibited from directly accessing the requested content, the content operation corresponding to the third party media request, the native media player request further configured to return the requested metadata to the third party application for display on a graphical user interface of the third party application, wherein the native media player is configured to be accessible through a native media player user interface and wherein the graphical user interface of the third party application and the native media player user interface are different interfaces;

means for storing a first state of the native media player, the first state of the native media player corresponding to a state of the native media player before the native media player performs the content operation;

means for performing, by the native media player, the content operation, wherein performing the content operation causes the native media player to transition into a second state; and means for transitioning the native media player to the first state in response to an indication that the third party application has terminated.

2. The apparatus of claim 1, wherein the first state comprises performing a different content operation.

3. The apparatus of claim 1, wherein the first state comprises at least one configuration parameter different from a corresponding at least one configuration parameter of the native media player after performing the content operation corresponding to the third party media request.

4. The apparatus of claim 1, further comprising:
means for storing the second state in response to the indication that the third party application has terminated;
means for transitioning the native media player to the second state in response to an indication that the third party application has started executing.

5. The apparatus of claim 4, wherein the indication that the third party application has started executing includes a determination that the third party application is a first type of application.

6. The apparatus of claim 4, wherein the indication that the third party application has started executing includes a determination that a user option associated with the third party application indicates to transition the native media player to the second state in response to executing the third party application.

7. The apparatus of claim 4, wherein the means for transitioning transitions the native media player to the first state if the third party application is of a first type.

8. The apparatus of claim 7, wherein the means for transitioning leaves the native media player in the second state if the third party application is of a second type.

9. The apparatus of claim 8, wherein the second state causes the means for performing to continue to perform the content operation after the third party application has terminated.

10. A method comprising:
receiving a third party media request from a third party application executing on a hardware device, the third party media request requesting access to content and metadata by a native media player on behalf of the third party application, and received through an application programmer interface that provides calls to operations of the native media player, the native media player executing on the hardware device;
converting the third party media request into a native media player request configured to cause the native media player to perform a content operation on the content on behalf of the third party application when the third party application is prohibited from directly accessing the requested content, the content operation corresponding to the third party media request, the native media player request further configured to return the requested metadata to the third party application for display on a graphical user interface of the third party application, wherein the native media player is configured to be accessible through a native media player user interface and wherein the graphical user interface of the third party application and the native media player user interface are different interfaces;

storing a first state of the native media player, the first state of the native media player corresponding to a state of the native media player before the native media player performs the content operation;

performing, by the native media player, the content operation, wherein performing the content operation causes the native media player to transition into a second state; and transitioning the native media player to the first state in response to an indication that the third party application has terminated.

11. The method of claim 10, wherein the first state comprises performing a different content operation.

12. The method of claim 10, wherein the first state comprises at least one configuration parameter different from a corresponding at least one configuration parameter of the native media player after performing the content operation corresponding to the third party media request.

13. The method of claim 10, further comprising:
storing the second state in response to the indication that the third party application has terminated;
transitioning the native media player to the second state in response to an indication that the third party application has started executing.

14. The method of claim 13, wherein the indication that the third party application has started executing includes a determination that the third party application is a first type of application.

15. The method of claim 13, wherein the indication that the third party application has started executing includes a determination that a user option associated with the third party application indicates to transition the native media player to the second state in response to executing the third party application.

16. The method of claim 10, wherein the native media player transitions to the first state if the third party application is of a first type.

17. The method of claim 10, wherein the native media player remains in the second state if the third party application is of a second type.

18. The method of claim 17, wherein the native media player continues to perform the content operation in the second state after the third party application has terminated.

19. A non-transitory machine readable storage medium storing executable instructions which when executed by one or more processors cause the one or more processors to perform operations comprising:
receiving, through an application programmer interface, a third party media request from a third party application executing on at least one of the processors, the third party media request requesting access to content and metadata by a native media player on behalf of the third party application, the application programmer interface providing calls to operations of the native media player, the native media player executing on at least one of the processors;
converting the third party media request into a native media player request configured to cause the native media player to perform a content operation on the content on behalf of the third party application when the third party application is prohibited from directly accessing the requested content, the content operation corresponding to the third party media request, the native media player request further configured to return the requested metadata to the third party application for display on a graphical user interface of the third party application, wherein the native media player is configured to be accessible through a native media player user interface and wherein the graphical user interface of the third party application and the native media player user interface are different interfaces;

storing a first state of the native media player, the first state of the native media player corresponding to a state of the native media player before the native media player performs the content operation;

performing, by the native media player, the content operation, wherein performing the content operation causes the native media player to transition into a second state; and transitioning the native media player to the first state in response to an indication that the third party application has terminated.

20. The non-transitory machine readable storage medium of claim 19, wherein the first state comprises performing a different content operation.

21. The non-transitory machine readable storage medium of claim 19, wherein the first state comprises at least one configuration parameter different from a corresponding at least one configuration parameter of the native media player after performing the content operation corresponding to the third party media request.

22. The non-transitory machine readable storage medium of claim 19, wherein the operations further comprise:
storing the second state in response to the indication that the third party application has terminated;
transitioning the native media player to the second state in response to an indication that the third party application has started executing.

23. The non-transitory machine readable storage medium of claim 22, wherein the indication that the third party application has started executing includes a determination that the third party application is a first type of application.

24. The non-transitory machine readable storage medium of claim 22, wherein the indication that the third party application has started executing includes a determination that a user option associated with the third party application indicates to transition the native media player to the second state in response to executing the third party application.

25. The non-transitory machine readable storage medium of claim 19, wherein the native media player transitions to the first state if the third party application is of a first type.

26. The non-transitory machine readable storage medium of claim 19, wherein the native media player remains in the second state if the third party application is of a second type.

27. The non-transitory machine readable storage medium of claim 26, wherein the native media player continues to perform the content operation in the second state after the third party application has terminated.

28. A system comprising:
one or more processors coupled to a memory through a bus;
executable instructions stored in the memory which when executed by one or more of the processors cause the processors to
receive, through an application programmer interface, a third party media request from a third party application executing on at least one of the processors, the third party media request requesting access to content and metadata by a native media player on behalf of the third party application, the application programmer interface providing calls to operations of the native media player, the native media player executing on at least one of the processors;
convert the third party media request into a native media player request configured to cause the native media player to perform a content operation on the content on behalf of the third party application when the third party application is prohibited from directly accessing the requested content, the content operation corresponding to the third party media request, the native media player request further configured to return the requested metadata to the third party application for display on a graphical user interface of the third party application, wherein the native media player is configured to be accessible through a native media player user interface and wherein the graphical user interface of the third party application and the native media player user interface are different interfaces;
store a first state of the native media player, the first state of the native media player corresponding to a state of the native media player before the native media player performs the content operation;
perform, by the native media player, the content operation, wherein performing the content operation causes the native media player to transition into a second state; and
transition the native media player to the first state in response to an indication that the third party application has terminated.

29. The system of claim 28, wherein the first state comprises performing a different content operation.

30. The system of claim 28, wherein the first state comprises at least one configuration parameter different from a corresponding at least one configuration parameter of the native media player after performing the content operation corresponding to the third party media request.

31. The system of claim 28, wherein the executable instructions further cause the processors to
store the second state in response to the indication that the third party application has terminated;
transition the native media player to the second state in response to an indication that the third party application has started executing.

32. The system of claim 31, wherein the indication that the third party application has started executing includes a determination that the third party application is a first type of application.

33. The system of claim 31, wherein the indication that the third party application has started executing includes a determination that a user option associated with the third party application indicates to transition the native media player to the second state in response to executing the third party application.

34. The system of claim 28, wherein the native media player transitions to the first state if the third party application is of a first type.

35. The system of claim 28, wherein the native media player remains in the second state if the third party application is of a second type.

36. The system of claim 28, wherein the native media player continues to perform the content operation in the second state after the third party application has terminated.

* * * * *